Feb. 9, 1965    C. FRANK    3,168,915
SELF-LOCKING BOLT AND NUT
Filed March 6, 1962
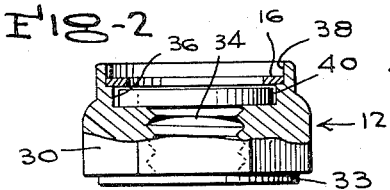
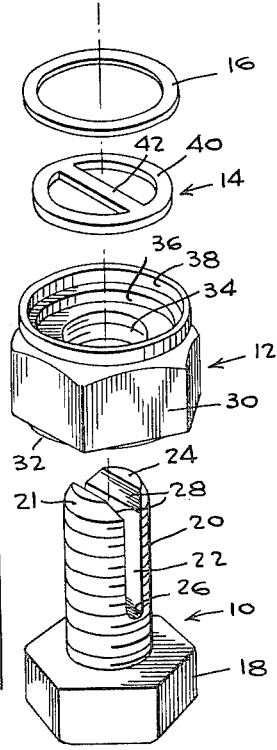
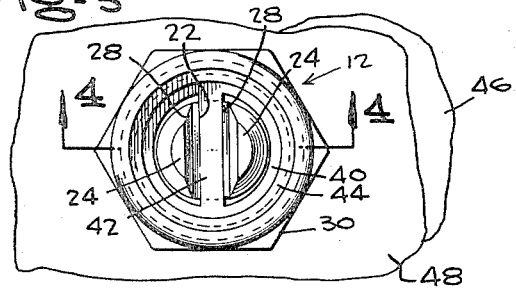
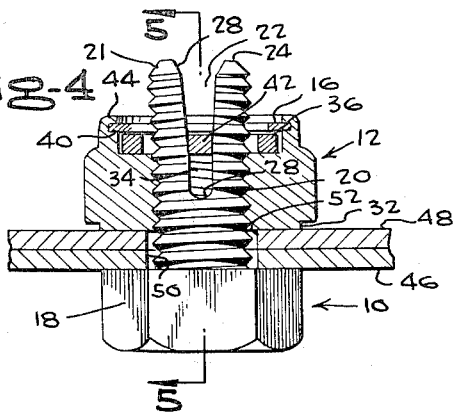
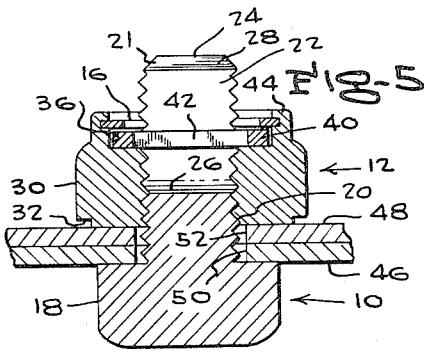
INVENTOR.
CHARLES FRANK
BY
*McMorrow, Berman & Davidson*
ATTORNEYS

United States Patent Office 3,168,915
Patented Feb. 9, 1965

---

3,168,915
SELF-LOCKING BOLT AND NUT
Charles Frank, 436 New Lots Ave., Brooklyn 7, N.Y.
Filed Mar. 6, 1962, Ser. No. 177,805
2 Claims. (Cl. 151—31)

This invention relates to a self-locking bolt and nut combination. Many locking devices for screw threads have been proposed heretofore, and are available in a variety of forms, but for the most part these involve destructive action on the threads, and are intended and adapted for single use only.

It is therefore a principal object of the present invention to provide a locking device which is adapted for multiple use, and a related object is to provide a locking bolt and nut combination having an action which does not impair the threads as in seizing or galling. A further object is to provide a device which, while affording a satisfactory lock which is proof against loosening under severe and continuous shock and vibration, is nevertheless removable, by deliberate action, with the expenditure of reasonably moderate forces.

These and other objects, which will be readily apparent, are attained by the present invention, a preferred embodiment of which may be briefly described as comprising a bolt with a bifurcated, threaded shank, and a nut carrying a captive, freely rotatable washer having a diametral spider, or cross member, adapted to receive the slot, in the bolt, and to spread the bifurcated shank and thus urge the threads into tight engagement.

For a more detailed description of the invention, reference is made to the following specification, as illustrated in the drawing, in which:

FIGURE 1 is an exploded view, in perspective, of the several parts of the lock device, FIGURE 2 is an elevational view of the assembled nut member, shown partially in axial section, FIGURE 3 is a top plan view of the nut, as engaged with its associated bolt, and securing one plate to another, FIGURE 4 is an axial, sectional view through the assembled bolt and nut, as seen along the plane of line 4—4 of FIGURE 3, and FIGURE 5 is a sectional view taken on the plane of the line 5—5 of FIGURE 4.

Referring to the drawing by characters of reference, FIGURE 1 shows the device as comprising four parts, including the bolt 10, nut 12, spreader ring 14, and keeper ring 16. The parts are preferably of corrosion-resistant material, or plated for this purpose. As shown, the bolt 10 has a hex head 18, but it will be understood that the particular form of head used is immaterial. The threaded shank, 20, of the bolt, has a corner bevel 21 on its outer end, for a thread lead, and has a diametral slot 22 opening into its flat, outer face 24, and extending the length of the shank as applicable. Although the threads on the shank are shown as occupying the full length of the shank, they may terminate at a point short of the head. In use, the bifurcated shank is adapted to be spread, as will be seen, and in order to avoid acute stresses at a critical point, the slot 22 will preferably have a rounded bottom 26. However, this is not a consideration of major moment, and with material of proper strength, and a slot of appreciable length, a square bottom will suffice. At the outer end of the slot, the two forks of the shank are bevelled, as at 28, for ready engagement with the spreader bar, presently to be described.

Elements 12, 14 and 16 are all part of the nut assembly. The nut proper, 12, shown as having a hexagonal periphery 30, has a cylindrical boss 32 on its under side, to provide an integral washer face. The nut, which has internal threads 34, mating with bolt shank 20, also has a first counterbore 36 in its upper face, and, in an initial stage of manufacture, has a second counterbore 38, shown in FIGURES 1 and 2. The first counterbore 36 loosely receives the spreader ring 14, which is preferably of high strength material, and comprises an outer ring or band 40, bridged by a diametral cross piece 42, the latter preferably having somewhat rounded corners. The second counterbore 38 snugly receives the ring 16, which overlaps the band 40 of the spreader ring. To retain the keeper ring 16, and hence the spreader ring 14, the upper rim of the nut is peened over, to produce an inwardly directed flange 44, as seen in FIGURES 4 and 5.

The ring 14 although held captive, is free to rotate and therefore to cooperate with the bolt shank during threading of the parts. In the application of the device, as in fastening one panel 46 to a second panel 48, having, respectively, bores 50 and 52, the bolt shank is inserted through the said bores, and the nut started onto the bolt shank. During this action, the cross bar 42 of the ring 40 is picked up by the slot in the bolt, the bevels 28 at the slot entrance and the rounded corners of the cross bar assisting in the pickup, and thereafter the ring 40 is constrained to rotate with the bolt shank. The cross bar 42 is slightly wider than the width of the bolt slot, and therefore, after the axial movement of the bolt shank has progressed to the point where the cross bar moves into the slot proper, beyond the bevelled ends, a spreading action is imparted to the tines of the forked shank, which causes a squeezing action on the engaged portion of the threads. Since the force producing the squeezing action is applied exteriorly of the engaged portion of the threads, the action is gently progressive, but nevertheless firm and positive It is thus not harmful to the threads, and the action of placement and removal may be accomplished hundreds of times without any noticeable lessening of efficiency.

While a certain preferred embodiment has been shown and described, various possible modifications will become apparent, in the light of this disclosure and the invention should not, therefore, be deemed as limited, except insofar as shall appear from the spirit and scope of the appended claims.

I claim:

1. For use in combination, a bolt having a threaded shank with a reduced outer end, and a diametral, axially directed slot opening through said outer end, the walls of said slot being bevelled at at least one of the outer corners thereof, and a nut having a threaded opening adapted to mate with said shank, and a first counterbore in surrounding relation to said opening, a ring loosely mounted in said first counterbore, in surrounding relation to said opening, and having a diametral cross member exceeding said slot in width, and substantially coextensive in depth with said ring, axially of the bolt, a second counterbore in surrounding relation to said first counterbore, and a ring received in said second counterbore, and overlying the outer edge of the first-mentioned ring, the outer edge of said nut being turned in overlapping relation to the second-mentioned ring.

2. For use in combination, a bolt having a threaded shank with a diametral, axially directed slot opening through its outer end, the walls of said slot being beveled at the outer corners, and a nut having a threaded opening adapted to mate with said shank, and a first counter bore in surrounding relation to said opening, a ring loosely mounted in said first counterbore, in surrounding relation to said opening, and having a diametral cross member exceeding said slot in width and substantially coextensive in depth with said ring axially of the bolt, a second counterbore of a diameter larger than the diameter of said first counterbore in surrounding relation to said first counterbore, and a ring received in said second counterbore, and overlying the outer edge of the first-mentioned ring, and a flange on the outer edge of said nut to hold said latter ring in said second counterbore.

References Cited in the file of this patent
UNITED STATES PATENTS

| | | |
|---|---|---|
| 462,752 | Weber | Nov. 10, 1891 |
| 642,066 | Bargelt | Jan. 30, 1900 |
| 1,180,572 | Cox | Apr. 25, 1916 |
| 1,358,586 | Schwab | Nov. 9, 1920 |
| 1,550,282 | Rennerfelt | Aug. 18, 1925 |
| 1,830,919 | Sundh | Nov. 10, 1931 |
| 2,082,956 | Hall | June 8, 1937 |
| 2,635,312 | McCullough | Apr. 21, 1953 |